(12) United States Patent
Wang et al.

(10) Patent No.: US 10,704,448 B2
(45) Date of Patent: Jul. 7, 2020

(54) EXHAUST GAS AFTER-TREATMENT MIXING DEVICE AND PACKAGE THEREFOR

(71) Applicant: Tenneco (Suzhou) Emission System Co., LTD., Suzhou, Jiangsu Province (CN)

(72) Inventors: Cong Wang, Suzhou (CN); Lin Wang, Suzhou (CN); Ping Wang, Suzhou (CN)

(73) Assignee: TENNECO (SUZHOU) EMISSION SYSTEM CO., LTD., Suzhou, Jiangsu Province (CN)

( * ) Notice: Subject to any disclaimer, the term of this patent is extended or adjusted under 35 U.S.C. 154(b) by 0 days.

(21) Appl. No.: 16/629,314

(22) PCT Filed: Apr. 25, 2018

(86) PCT No.: PCT/CN2018/084388
§ 371 (c)(1),
(2) Date: Jan. 7, 2020

(87) PCT Pub. No.: WO2019/011036
PCT Pub. Date: Jan. 17, 2019

(65) Prior Publication Data
US 2020/0131974 A1    Apr. 30, 2020

(30) Foreign Application Priority Data
Jul. 11, 2017    (CN) .......................... 2017 1 0561334

(51) Int. Cl.
*F01N 13/08*    (2010.01)
*F01N 3/08*    (2006.01)
(Continued)

(52) U.S. Cl.
CPC ......... *F01N 13/082* (2013.01); *F01N 3/0871* (2013.01); *F01N 3/206* (2013.01); *F01N 3/035* (2013.01)

(58) Field of Classification Search
CPC ...... F01N 3/0971; F01N 13/082; F01N 3/206; F01N 3/035
(Continued)

(56) References Cited

U.S. PATENT DOCUMENTS

| 5,514,347 A | 5/1996 | Ohashi et al. |
| 8,539,761 B2 * | 9/2013 | Lebas ................. B01F 3/04049 60/324 |

(Continued)

FOREIGN PATENT DOCUMENTS

| CN | 105156181 A | 12/2015 |
| CN | 106014560 A | 10/2016 |

(Continued)

*Primary Examiner* — Tom P Duong
(74) *Attorney, Agent, or Firm* — Cheng-Ju Chiang (57) ABSTRACT

The present application discloses an exhaust gas after-treatment mixing device including a first plate, a second plate and a mixer. The mixer includes a first space, a second space and a third space located between the first space and the second space. Top portions of the first space and the second space are in communication with the third space. The mixer includes a first raised portion protruding into the third space and a second raised portion located below the first raised portion. A fourth space is formed between the first raised portion and the second raised portion. As a result, the distance and time of urea evaporation is increased and the mixing uniformity is improved. Besides, a package with the exhaust gas after-treatment mixing device is also provided.

20 Claims, 9 Drawing Sheets

(51) Int. Cl.
  *F01N 3/20* (2006.01)
  *F01N 3/035* (2006.01)
(58) Field of Classification Search
  USPC .................................................. 422/168, 176
  See application file for complete search history.

(56) References Cited

U.S. PATENT DOCUMENTS

| | | | |
|---|---|---|---|
| 8,661,792 B2 * | 3/2014 | Greber | F01N 3/2066 60/295 |
| 9,581,067 B2 * | 2/2017 | Guilbaud | B01F 5/0268 |
| 2014/0044603 A1 * | 2/2014 | Greber | F01N 13/0097 422/171 |
| 2015/0110681 A1 * | 4/2015 | Ferront | B01F 5/0268 422/168 |
| 2016/0131007 A1 * | 5/2016 | Kauderer | B01F 5/0608 422/177 |
| 2016/0317986 A1 * | 11/2016 | Alano | F01N 3/021 |
| 2016/0361694 A1 * | 12/2016 | Brandl | B01F 5/0693 |
| 2017/0089246 A1 * | 3/2017 | Greber | B01F 5/0473 |
| 2018/0066559 A1 | 3/2018 | Haverkamp et al. | |
| 2019/0201854 A1 | 7/2019 | Cvelbar | |
| 2019/0323402 A1 | 10/2019 | Tucker et al. | |

FOREIGN PATENT DOCUMENTS

| | | | |
|---|---|---|---|
| CN | 206987928 U | 2/2018 | |
| DE | 102015103425 B3 | 5/2016 | |

\* cited by examiner

EXHAUST GAS AFTER-TREATMENT MIXING DEVICE AND PACKAGE THEREFOR

CROSS-REFERENCE TO RELATED APPLICATION

This patent application is a 35 U.S.C. § 371 National Phase conversion of International (PCT) Patent Application No. PCT/CN2018/084388, filed on Apr. 25, 2018, which claims priority to a Chinese Patent Application No. 201710561334.X, filed on Jul. 11, 2017 with an invention title of "Exhaust Gas After-Treatment Mixing Device and Package Therefor", the entire content of which is incorporated herein by reference. The PCT International Patent Application was filed and published in Chinese.

TECHNICAL FIELD

The invention relates to an exhaust gas after-treatment mixing device and a package thereof, which belongs to the technical field of engine exhaust gas after-treatment.

BACKGROUND

Studies have shown that the uniformity of ammonia distribution in the exhaust gas after-treatment system (such as Selective Catalytic Reduction system, SCR system) has a significant impact on the overall performance and durability of the system. If the ammonia distribution is not uniform, it will cause too much ammonia in the local area and easily cause ammonia leakage, while in other ammonia-thin areas, the conversion efficiency of nitrogen oxides (NOx) will be too low. The uneven distribution of ammonia over a long period of time will lead to uneven aging of the catalyst, which will affect the overall performance of the catalyst. In addition, the uneven distribution of urea droplets will cause the temperature of the local pipe wall or the mixed structure to be too low, forming crystals, and in severe cases, the exhaust pipe will be blocked, resulting in a decrease in engine power performance.

Therefore, it is necessary to provide a new type of exhaust gas after-treatment mixing device and an exhaust gas after-treatment package therefor to solve the above technical problems.

SUMMARY

An object of the present application is to provide an exhaust gas after-treatment mixing device with robust anti-crystallization ability and a package having the exhaust gas after-treatment mixing device.

In order to achieve the above object, the present application adopts the following technical solution: an exhaust gas after-treatment mixing device including a casing and a mixing assembly located in the casing. The casing includes a mounting seat for mounting a urea injector to spray urea into the mixing assembly. The mixing assembly includes a first plate, a second plate and a mixer located between the first plate and the second plate. The first plate has a first inlet and a second inlet respectively located at two sides of the first plate. The mixer includes a first space in communication with the first inlet, a second space in communication with the second inlet, and a third space located between the first space and the second space. A top portion of the first space is in communication with the third space, and a top portion of the second space is also in communication with the third space. The mixer includes a first raised portion protruding from the bottom into the third space and a second raised portion located below the first raised portion, so that a fourth space is formed between the first raised portion and the second raised portion. The first raised portion includes a first side and a second side, wherein the first side includes a plurality of first perforations to communicate the third space with the fourth space, and the second side includes a plurality of second perforations to communicate the third space with the fourth space. The second plate is provided with an outlet in communication with the fourth space.

As a further improved technical solution of the present application, the mixer includes a first curved wall and a first partition wall to mate with the first curved wall. The first space is located between the first curved wall and the first partition wall.

As a further improved technical solution of the present application, the first partition wall includes a first fixing portion fixed to a bottom of the first curved wall and a first extension arm located on an inner side of the first curved wall. A first swirling direction is defined between the first curved wall and the first partition wall.

As a further improved technical solution of the present application, the mixer includes a second curved wall and a second partition wall to mate with the second curved wall. The second space is located between the second curved wall and the second partition wall.

As a further improved technical solution of the present application, the second partition wall is provided with a second fixing portion fixed to a bottom of the second curved wall and a second extension arm located on an inner side of the second curved wall. A second swirling direction is defined between the second curved wall and the second partition wall, wherein the first swirling direction is one of clockwise and counterclockwise directions, and the second swirling direction is the other of the clockwise and counterclockwise directions.

As a further improved technical solution of the present application, the first swirling direction and the second swirling direction are both within a cross section of the casing. A third swirling direction and a fourth swirling direction are also defined in the fourth space and located within the cross section, wherein the third swirling direction is substantially the same as the first swirling direction, and the fourth swirling direction is substantially the same as the second swirling direction.

As a further improved technical solution of the present application, the first raised portion comprises a first top portion connecting the first side and the second side, a first bottom portion extending outwardly from a bottom of the first side, and a second bottom portion extending outwardly from a bottom of the second side. The second raised portion includes a third side, a fourth side opposite to the third side, a second top portion connecting the third side and the fourth side, a third bottom portion extending outwardly from a bottom of the third side, and a fourth bottom portion extending outwardly from a bottom of the fourth side.

As a further improved technical solution of the present application, an angle formed by the first side and the second side is an acute angle, and the first top portion, the first bottom portion and the second bottom portion are all arc-shaped.

As a further improved technical solution of the present application, the shape of the first raised portion is the same as that of the second raised portion. An angle formed by the third side and the fourth side is an acute angle, and the second top portion, the third bottom portion and the fourth bottom portion are all arc-shaped.

As a further improved technical solution of the present application, the third bottom portion and the fourth bottom portion are fixed inside the casing.

As a further improved technical solution of the present application, the first space, the second space, the third space and the fourth space are blocked by the second plate along an exhaust gas inlet direction, so that most of airflow must rotate from the first space and the second space into the third space, and then flow in a double swirl manner to the outlet in the fourth space.

As a further improved technical solution of the present application, the first raised portion, the first curved wall and the second curved wall are formed by bending a plate to be ω-shaped as a whole.

As a further improved technical solution of the present application, the outlet includes a first outlet and a second outlet located on both sides of the second plate, respectively.

As a further improved technical solution of the present application, the first outlet and the second outlet are both located at edges of the second plate.

As a further improved technical solution of the present application, the first plate is provided with a notch communicating with the fourth space.

As a further improved technical solution of the present application, the urea injector is configured to spray atomized urea droplets into the third space.

The present application further discloses an exhaust gas after-treatment package including a first after-treatment carrier assembly, a second after-treatment carrier assembly downstream of the first after-treatment carrier assembly, and a third after-treatment carrier assembly downstream of the second after-treatment carrier assembly. The exhaust gas after-treatment package further includes an exhaust gas after-treatment mixing device located between the second after-treatment carrier assembly and the third after-treatment carrier assembly. The exhaust gas after-treatment mixing device is the above described exhaust gas after-treatment mixing device.

Compared with the prior art, the present application forms a fourth space between the first raised portion and the second raised portion by providing a second raised portion. This setting makes full use of the cross section, increases the distance and time for urea evaporation, and improves the uniformity of airflow mixing.

DETAILED DESCRIPTION

Please refer to FIG. 1 to FIG. 9, the present application discloses an exhaust gas after-treatment mixing device 100 which is used in an after-treatment system, such as a SCR after-treatment system to treat engine exhaust. The exhaust gas after-treatment mixing device 100 includes a casing 1 and a mixing assembly 2 installed in the casing 1.

In the illustrated embodiment of the present application, the casing 1 has a cylindrical shape, and is provided with a mounting plate 11 recessed into the casing 1 and a mounting seat (not shown) welded to the mounting plate 11. The mounting seat is used to install a urea injector (not shown) to spray urea into the mixing assembly 2.

Figure 6:
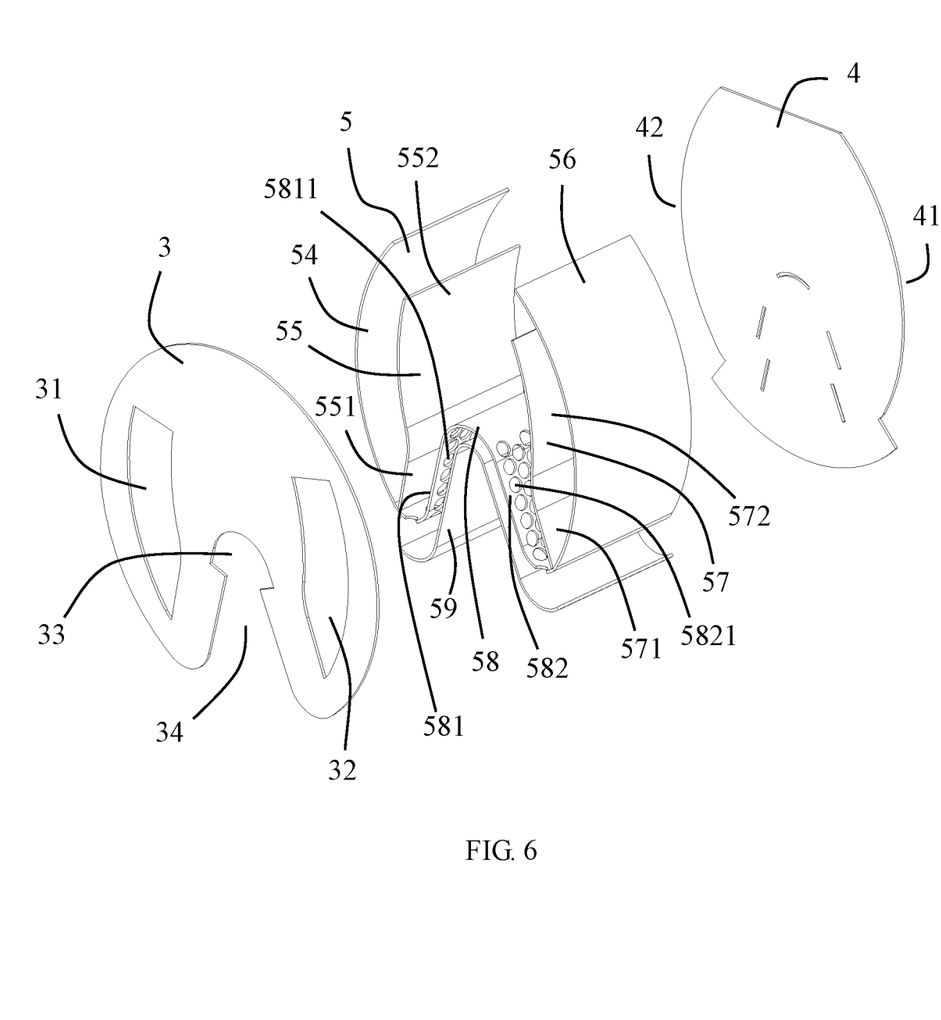
FIG. 6 is an exploded perspective view of FIG. 5.

The mixing assembly 2 includes a first plate 3, a second plate 4 and a mixer 5 located between the first plate 3 and the second plate 4. The first plate 3 is fixed in the casing 1. The first plate 3 is provided with a first inlet 31 and a second inlet 32 respectively located on two sides thereof. In addition, the first plate 3 is further provided with an arc-shaped notch 33 located at a middle portion thereof and a notch 34 located below the arc-shaped notch 33.

Figure 1:
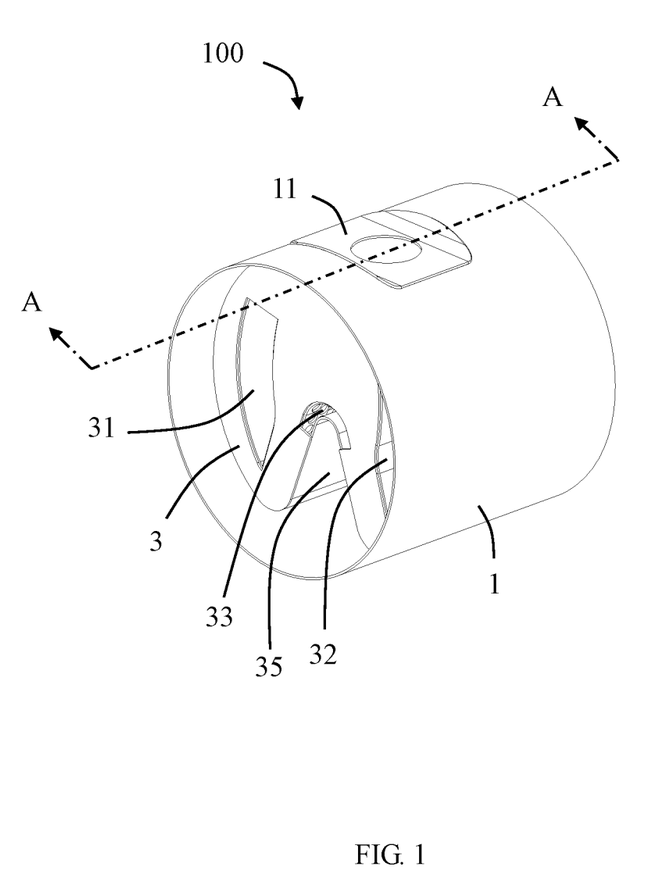
FIG. 1 is a schematic perspective view of an exhaust gas after-treatment mixing device according to the present application.
Figure 2:
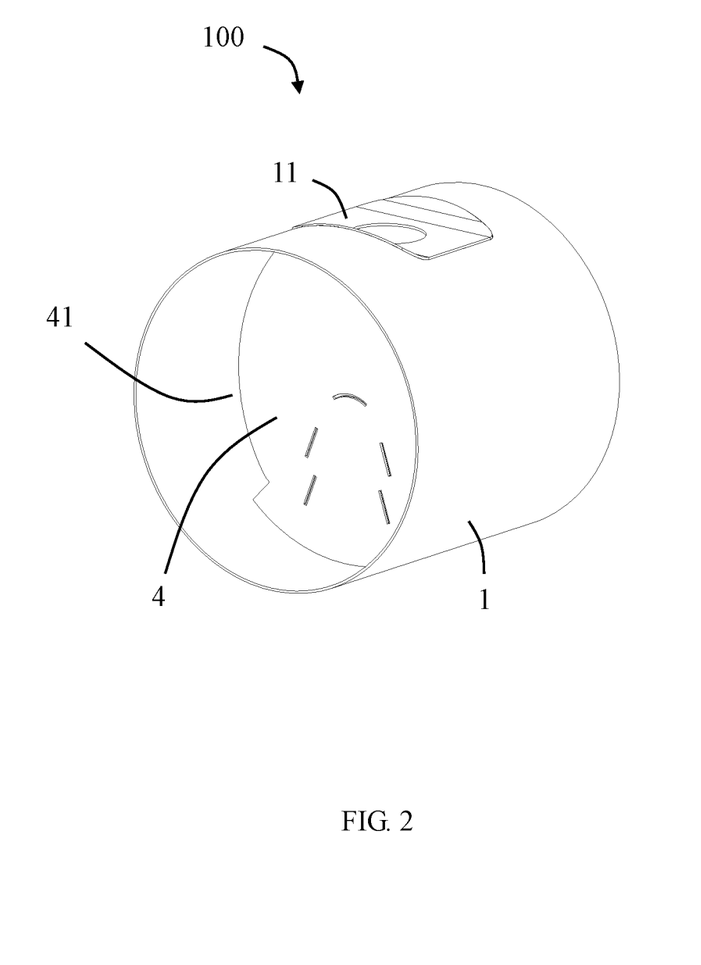
FIG. 2 is a schematic perspective view of FIG. 1 from another angle.
Figure 3:
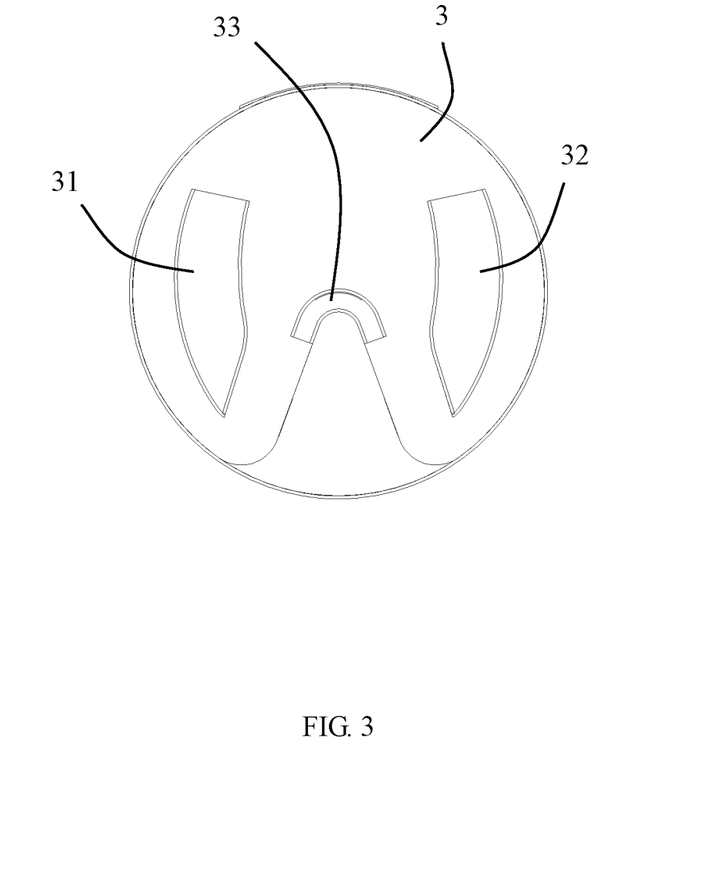
FIG. 3 is a left side view of FIG. 1.
Figure 4:
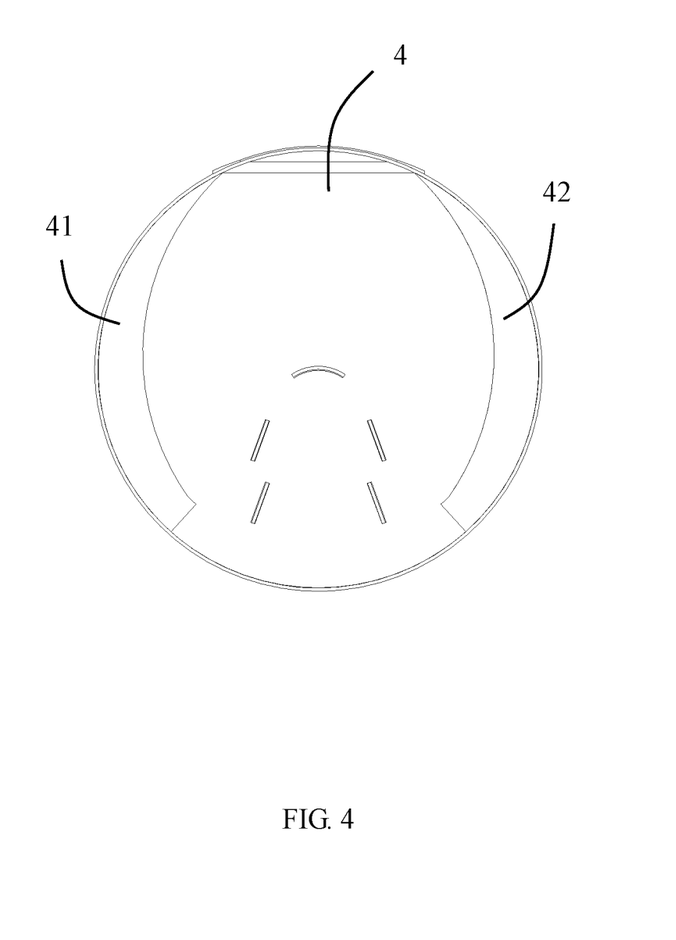
FIG. 4 is a right side view of FIG. 1.
Figure 5:
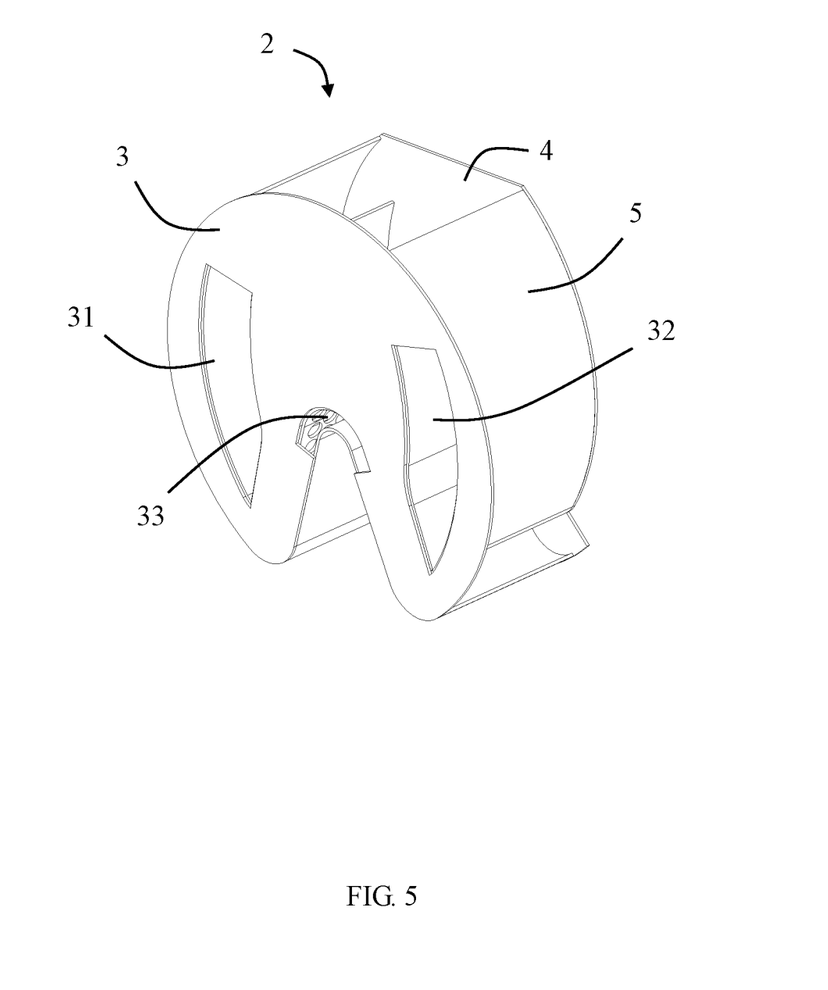
FIG. 5 is a schematic perspective view with the casing in FIG. 1 removed.

Please refer to FIG. 4 and FIG. 6, the second plate 4 is provided with an outlet. In the illustrated embodiment of the present application, the outlet includes a first outlet 41 and a second outlet 42 located on both sides, respectively. The first outlet 41 and the second outlet 42 are both located at edges of the second plate 4.

As shown in FIG. 6, the mixer 5 includes a first space 51 in communication with the first inlet 31, a second space 52 in communication with the second inlet 32, and a third space 53 located between the first space 51 and the second space 52. The top of the first space 51 is in communication with the third space 53, and the top of the second space 52 is also in communication with the third space 53. The first space 51, the second space 52 and the third space 53 are blocked by the second plate 4 in the exhaust gas inlet direction, so that most of the airflow must pass from the first space 51 and the second space 52 before entering the third space 53. The urea injector is used to spray atomized urea droplets into the third space 53.

Specifically, the mixer 5 includes a first curved wall 54, a first partition wall 55 mating with the first curved wall 54, a second curved wall 56, a second partition wall 57 mating with the second curved wall 56, and a first raised portion 58 protruding from the bottom into the third space 53. The first space 51 is located between the first curved wall 54 and the first partition wall 55, and the second space 52 is located between the second curved wall 56 and the second partition wall 57. The first partition wall 55 is provided with a first fixing portion 551 fixed to a bottom of the first curved wall 54 and a first extension arm 552 located inside the first curved wall 54. A first swirling direction S1 is defined between the first curved wall 54 and the first partition wall 55. In the illustrated embodiment of the present application, the first extension arm 552 is arc-shaped, and the first extension arm 552 and the first curved wall 54 are bent in the same direction, which makes the first swirling direction S1 relatively smooth. The second partition wall 57 is provided with a second fixing portion 571 fixed to the bottom of the second curved wall 56 and a second extension arm 572 located inside the second curved wall 56. A second swirling direction S2 is defined between the second curved wall 56 and the second partition wall 57. In the illustrated embodiment of the present application, the second extension arm 572 is arc-shaped, and the second extension arm 572 is bent in the same direction as the second curved wall 56, which makes the second swirling direction S2 relatively smooth. The first swirling direction S1 is one of clockwise or counterclockwise, and the second swirling direction S2 is the other of the clockwise or counterclockwise. Please refer to the hollow arrow in FIG. 7, in the illustrated embodiment of the present application, the first swirling direction S1 is a clockwise direction, and the second swirling direction S2 is a counterclockwise direction. In this way, the cross-section of the exhaust gas after-treatment mixing device 100 can be fully utilized to increase the mixing distance of urea and exhaust gas in a manner of forming a double swirl flow, improve the uniformity of urea evaporation and mixing, and have strong anti-crystallization ability. In the illustrated embodiment of the present application, the first extension arm 552 and the first curved wall 54 form a first opening 541 that is gradually contracted in a bottom to top direction. The second extension arm 572 and the second curved wall 56 form a gradually shrinking second opening 561 in the bottom to top direction. In the illustrated embodiment of the present application, the first raised portion 58, the first curved wall 54 and the second curved wall 56 are formed by bending a single plate, and the shape is generally ω-shaped as a whole.

The mixer 5 is provided with a second raised portion 59 below the first raised portion 58 to form a fourth space 50 between the first raised portion 58 and the second raised portion 59. The fourth space 50 is blocked by the second plate 4 in the exhaust gas inlet direction. The mixer 5 further includes a cavity 35 located below the second raised portion 59 and corresponding to the recess 34. The first raised portion 58 is provided with a first side 581, a second side 582, a first top portion 583 connecting the first side 581 and the second side 582, a first bottom portion 584 extending outwardly from a bottom of the first side 581, and a second bottom portion 585 extending outwardly from a bottom of the second side 582. In the illustrated embodiment of the present application, an angle formed by the first side 581 and the second side 582 is an acute angle. The first top portion 583, the first bottom portion 584 and the second bottom portion 585 are all arc-shaped. The first side 581 is provided with a plurality of first perforations 5811 that communicate the third space 53 with the fourth space 50. The second side 582 is provided with a plurality of second perforations 5821 that communicate the third space 53 with the fourth space 50. The notch 33 of the first plate 3 and the first and the second outlets 41, 42 of the second plate 4 are in communication with the fourth space 50. The first perforations 5811 and the second perforations 5821 are beneficial to achieve urea crushing to become finer particles, and enhance heat exchange, thereby facilitating better evaporation. When the exhaust gas mixture passes through the first perforation 5811 and the second perforation 5821, it is easy to form a "dead zone" with a lower flow velocity on the leeward side of the first side 581 and the second side 582. However, in the illustrated embodiment of the present application, the notch 33 enables the exhaust gas to directly purge the "dead zone", thereby effectively reducing the risk of crystallization here. At the same time, the exhaust gas can also heat the area, further reducing the risk of urea crystallization.

Figure 7:
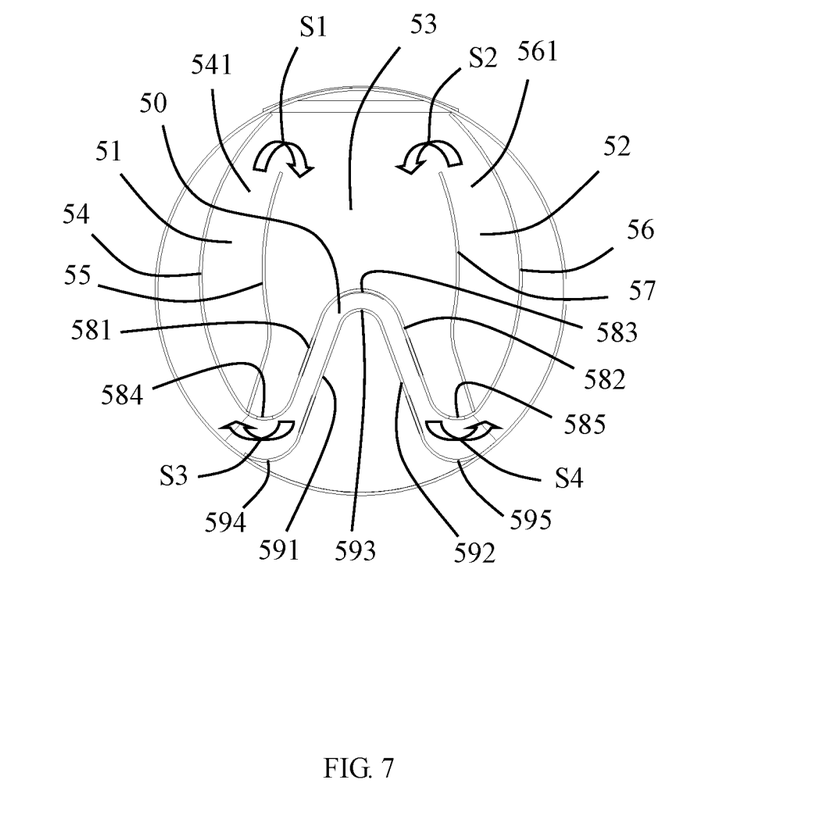
FIG. 7 is a front view with the first plate in FIG. 3 removed.
Figure 8:
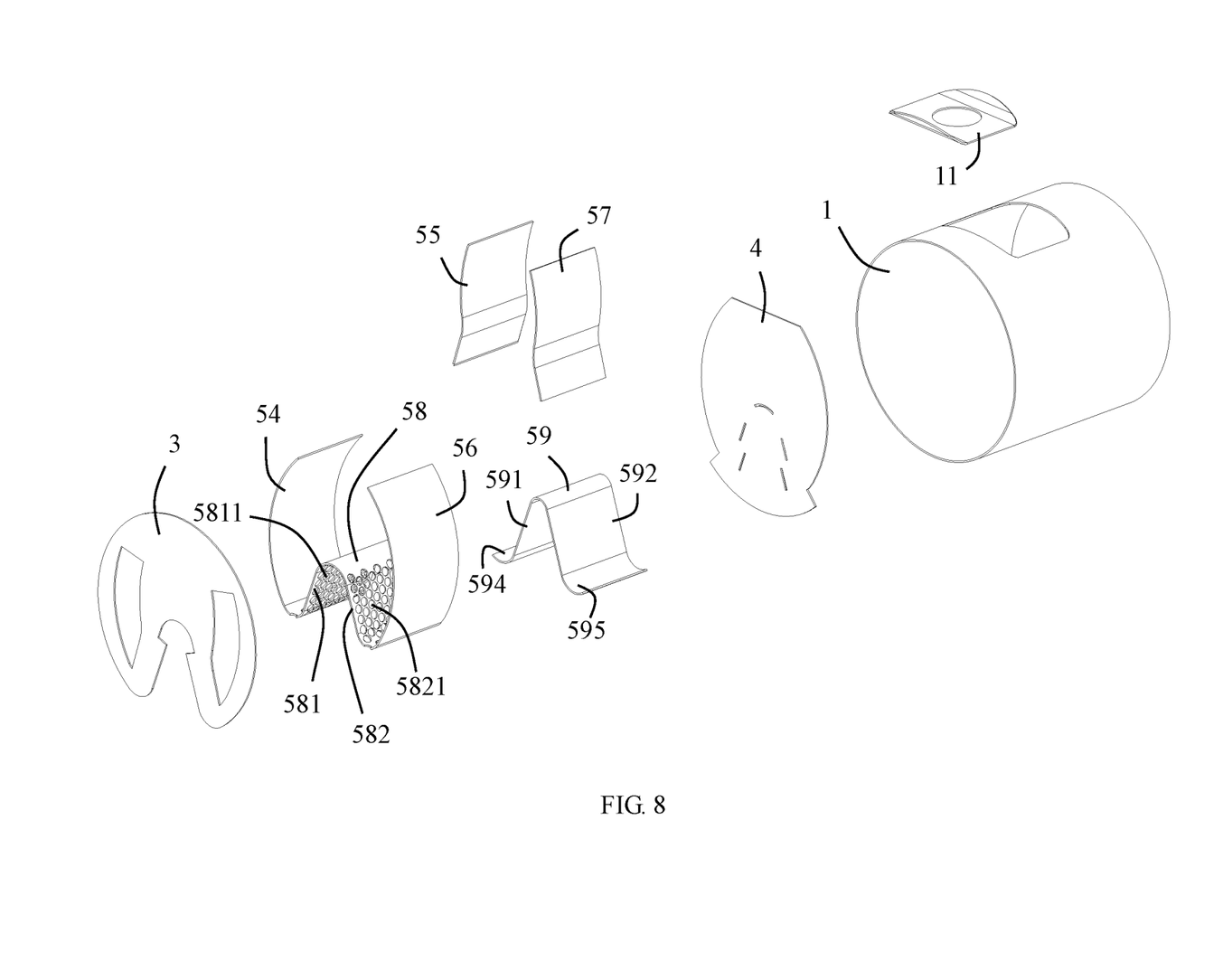
FIG. 8 is an exploded perspective view of FIG. 1.
Figure 9:
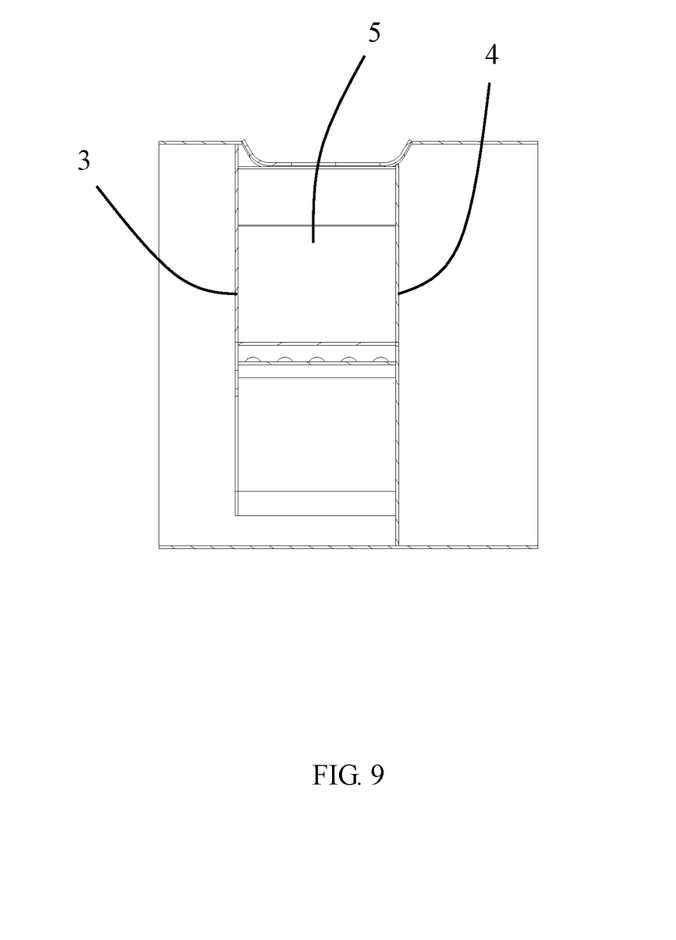
FIG. 9 is a schematic cross-sectional view taken along the line A-A in FIG. 1.

The shape of the first raised portion 58 is the same as that of the second raised portion 59. The second raised portion 59 includes a third side 591, a fourth side 592 opposite to the third side 591, a second top portion 593 connecting the third side 591 and the fourth side 592, a third bottom portion 594 extending outwardly from a bottom of the third side 591, and a fourth bottom portion 595 extending outwardly from a bottom of the fourth side 592. An angle formed by the third side 591 and the fourth side 592 is an acute angle. The second top portion 593, the third bottom portion 594 and the fourth bottom portion 595 are all arc-shaped. As shown in FIG. 7, the third bottom portion 594 and the fourth bottom portion 595 are fixed on the inner side of the casing 1.

Please refer to FIG. 7, the first swirling direction S1 and the second swirling direction S2 are both in a cross section of the casing 1. The fourth space 50 further defines a third swirling direction S3 and a fourth swirling direction S4 located in the cross section, wherein the third swirling direction S3 is substantially the same as the first swirling direction S1, and the fourth swirling direction S4 is substantially the same as the second swirling direction S2. In this way, the cross-section of the exhaust gas after-treatment mixing device 100 can be fully utilized to increase the mixing distance of urea and exhaust gas in a manner of forming a double swirl flow, improve the uniformity of urea evaporation and mixing, and have robust anti-crystallization ability.

When the exhaust gas of the engine enters the exhaust gas after-treatment mixing device 100, most of the exhaust gas enters the mixer 5 from the first and second inlets 31 and 32, and a small part of the exhaust gas passes directly through the gap 33 to enter the fourth space 50. The exhaust gas entered the cavity 35 is blocked by the second plate 4 and cannot pass directly. It can provide a certain degree of heating to the mixer 5. The exhaust gas entered the first and the second spaces 51, 52 is rotated into the third space 53 from both sides under the guidance of the arc structure. When the injection conditions are satisfied, the urea injector sprays urea into the third space 53, the atomized urea droplets and the exhaust of the engine rotate and mix together, and pass through the first and the second perforations 5811, 5821 into the fourth space 50. Please refer to FIG. 7, the mixture of urea droplets and the exhaust of the engine flows to the outlet in a double swirling manner along the third swirling direction S3 and the fourth swirling direction S4, and finally leaves from the first outlet 41 and the second outlet 42.

The present application also relates to an exhaust gas after-treatment package, which includes a first after-treatment carrier assembly (not shown), a second after-treatment carrier assembly (not shown) located downstream of the first after-treatment carrier assembly, and a third after-treatment carrier assembly (not shown) downstream of the second after-treatment carrier assembly. The exhaust gas after-treatment mixing device is located between the second after-treatment carrier assembly and the third after-treatment carrier assembly. Preferably, the first after-treatment carrier assembly is a Diesel Oxidation Catalyst (DOC), the second after-treatment carrier assembly is a Diesel Particulate Filter (DPF), and the third after-treatment carrier assembly is a Selective Catalytic Reduction (SCR).

It should be noted that the orientations of "upper", "lower", "top", "bottom" and the like described in the present application should not be limitedly understood, because these positional relationships should also be carried out according to the placement of the components. Adaptive understanding. In addition, the above embodiments are only used to illustrate the present application and not to limit the technical solutions described in the present application. The understanding of this specification should be based on those skilled in the art, although the present application has been carried out with reference to the above-mentioned embodiments in the detailed description, however, those of ordinary skill in the art should understand that those skilled in the art can still modify or equivalently replace the present application, and all technical solutions and improvements without departing from the spirit and scope of the present application should be within the scope of the claims of the present application.

What is claimed is:

1. An exhaust gas after-treatment mixing device, comprising:
   a casing comprising a mounting seat for mounting a urea injector to spray urea; and
   a mixing assembly located in the casing, the urea being sprayed to the mixing assembly, the mixing assembly comprising:
      a first plate having a first inlet and a second inlet respectively located at two sides of the first plate;
      a second plate; and
      a mixer located between the first plate and the second plate, wherein:
   the mixer comprises a first space in communication with the first inlet, a second space in communication with the second inlet, and a third space located between the first space and the second space, a top portion of the first space being in communication with the third space, and a top portion of the second space being also in communication with the third space; wherein
   the mixer comprises a first raised portion protruding from the bottom into the third space and a second raised portion located below the first raised portion, so that a fourth space is formed between the first raised portion and the second raised portion; wherein
   the first raised portion comprises a first side and a second side, the first side comprises a plurality of first perforations to communicate the third space with the fourth space, and the second side comprises a plurality of second perforations to communicate the third space with the fourth space; wherein
   the second plate is provided with an outlet in communication with the fourth space.

2. The exhaust gas after-treatment mixing device according to claim 1, wherein the mixer comprises a first curved wall and a first partition wall to mate with the first curved wall, and the first space is located between the first curved wall and the first partition wall.

3. The exhaust gas after-treatment mixing device according to claim 2, wherein the first partition wall comprises a first fixing portion fixed to a bottom of the first curved wall and a first extension arm located on an inner side of the first curved wall; and a first swirling direction is defined between the first curved wall and the first partition wall.

4. The exhaust gas after-treatment mixing device according to claim 3, wherein the mixer comprises a second curved wall and a second partition wall to mate with the second curved wall; and the second space is located between the second curved wall and the second partition wall.

5. The exhaust gas after-treatment mixing device according to claim 4, wherein the second partition wall is provided with a second fixing portion fixed to a bottom of the second curved wall and a second extension arm located on an inner side of the second curved wall, a second swirling direction being defined between the second curved wall and the second partition wall, wherein the first swirling direction is one of clockwise and counterclockwise directions, and the second swirling direction is the other of the clockwise and counterclockwise directions.

6. The exhaust gas after-treatment mixing device according to claim 5, wherein the first swirling direction and the second swirling direction are both within a cross section of the casing; a third swirling direction and a fourth swirling direction are also defined in the fourth space and located within the cross section, wherein the third swirling direction is substantially the same as the first swirling direction, and the fourth swirling direction is substantially the same as the second swirling direction.

7. The exhaust gas after-treatment mixing device according to claim 4, wherein the first raised portion, the first curved wall and the second curved wall are formed by bending a plate to be W-shaped as a whole.

8. The exhaust gas after-treatment mixing device according to claim 1, wherein the first raised portion comprises a first top portion connecting the first side and the second side, a first bottom portion extending outwardly from a bottom of the first side, and a second bottom portion extending outwardly from a bottom of the second side; the second raised portion comprising a third side, a fourth side opposite to the third side, a second top portion connecting the third side and the fourth side, a third bottom portion extending outwardly from a bottom of the third side, and a fourth bottom portion extending outwardly from a bottom of the fourth side.

9. The exhaust gas after-treatment mixing device according to claim 8, wherein an angle formed by the first side and the second side is an acute angle, and the first top portion, the first bottom portion and the second bottom portion are all arc-shaped.

10. The exhaust gas after-treatment mixing device according to claim 8, wherein the shape of the first raised portion is the same as that of the second raised portion; an angle formed by the third side and the fourth side is an acute angle, and the second top portion, the third bottom portion and the fourth bottom portion are all arc-shaped.

11. The exhaust gas after-treatment mixing device according to claim 10, wherein the third bottom portion and the fourth bottom portion are fixed inside the casing.

12. The exhaust gas after-treatment mixing device according to claim 1, wherein the first space, the second space, the third space and the fourth space are blocked by the second plate along an exhaust gas inlet direction, so that most of airflow must rotate from the first space and the second space into the third space, and then flow in a double swirl manner to the outlet in the fourth space.

13. The exhaust gas after-treatment mixing device according to claim 1, wherein the outlet comprises a first outlet and a second outlet located on both sides of the second plate, respectively.

14. The exhaust gas after-treatment mixing device according to claim 13, wherein the first outlet and the second outlet are both located at edges of the second plate.

15. The exhaust gas after-treatment mixing device according to claim 1, wherein the first plate is provided with a notch communicating with the fourth space.

16. The exhaust gas after-treatment mixing device according to claim 1, wherein the urea injector is configured to spray atomized urea droplets into the third space.

17. An exhaust gas after-treatment package comprising a first after-treatment carrier assembly, a second after-treatment carrier assembly downstream of the first after-treatment carrier assembly, and a third after-treatment carrier assembly downstream of the second after-treatment carrier assembly, wherein the exhaust gas after-treatment package further comprises an exhaust gas after-treatment mixing device located between the second after-treatment carrier assembly and the third after-treatment carrier assembly, and the exhaust gas after-treatment mixing device comprises:
   a casing comprising a mounting seat for mounting a urea injector to spray urea; and a mixing assembly located in the casing, the urea being sprayed to the mixing assembly, the mixing assembly comprising:
- a first plate having a first inlet and a second inlet respectively located at two sides of the first plate;
- a second plate; and
- a mixer located between the first plate and the second plate, wherein:

the mixer comprises a first space in communication with the first inlet, a second space in communication with the second inlet, and a third space located between the first space and the second space, a top portion of the first space being in communication with the third space, and a top portion of the second space being also in communication with the third space; wherein the mixer comprises a first raised portion protruding from the bottom into the third space and a second raised portion located below the first raised portion, so that a fourth space is formed between the first raised portion and the second raised portion; wherein the first raised portion comprises a first side and a second side, the first side comprises a plurality of first perforations to communicate the third space with the fourth space, and the second side comprises a plurality of second perforations to communicate the third space with the fourth space; wherein the second plate is provided with an outlet in communication with the fourth space.

18. The exhaust gas after-treatment package according to claim 17, wherein the mixer comprises a first curved wall and a first partition wall to mate with the first curved wall, and the first space is located between the first curved wall and the first partition wall; wherein the first partition wall comprises a first fixing portion fixed to a bottom of the first curved wall and a first extension arm located on an inner side of the first curved wall; and a first swirling direction is defined between the first curved wall and the first partition wall; wherein the mixer comprises a second curved wall and a second partition wall to mate with the second curved wall; and the second space is located between the second curved wall and the second partition wall; wherein the second partition wall is provided with a second fixing portion fixed to a bottom of the second curved wall and a second extension arm located on an inner side of the second curved wall, a second swirling direction being defined between the second curved wall and the second partition wall, wherein the first swirling direction is one of clockwise and counterclockwise directions, and the second swirling direction is the other of the clockwise and counterclockwise directions; wherein the first swirling direction and the second swirling direction are both within a cross section of the casing; a third swirling direction and a fourth swirling direction are also defined in the fourth space and located within the cross section, wherein the third swirling direction is substantially the same as the first swirling direction, and the fourth swirling direction is substantially the same as the second swirling direction.

19. The exhaust gas after-treatment package according to claim 17, wherein the first raised portion comprises a first top portion connecting the first side and the second side, a first bottom portion extending outwardly from a bottom of the first side, and a second bottom portion extending outwardly from a bottom of the second side; the second raised portion comprising a third side, a fourth side opposite to the third side, a second top portion connecting the third side and the fourth side, a third bottom portion extending outwardly from a bottom of the third side, and a fourth bottom portion extending outwardly from a bottom of the fourth side; wherein an angle formed by the first side and the second side is an acute angle, and the first top portion, the first bottom portion and the second bottom portion are all arc-shaped; wherein the shape of the first raised portion is the same as that of the second raised portion; an angle formed by the third side and the fourth side is an acute angle, and the second top portion, the third bottom portion and the fourth bottom portion are all arc-shaped; wherein the third bottom portion and the fourth bottom portion are fixed inside the casing.

20. The exhaust gas after-treatment package according to claim 17, wherein the first space, the second space, the third space and the fourth space are blocked by the second plate along an exhaust gas inlet direction, so that most of airflow must rotate from the first space and the second space into the third space, and then flow in a double swirl manner to the outlet in the fourth space.

* * * * *